May 17, 1932.     F. H. OWENS     1,859,243

MEANS AND METHOD FOR RECORDING PHOTOGRAPHIC SOUND RECORDS

Filed Sept. 17, 1928

INVENTOR.
FREEMAN H. OWENS.
BY
John O. Brady
ATTORNEY

Patented May 17, 1932

1,859,243

UNITED STATES PATENT OFFICE

FREEMAN H. OWENS, OF NEW YORK, N. Y.

MEANS AND METHOD FOR RECORDING PHOTOGRAPHIC SOUND RECORDS

Application filed September 17, 1928. Serial No. 306,495.

My invention relates to a means and method for recording photographic sound records, and has for its primary object the provision of means for recording sound on photographic film by the use of a light source of constant intensity.

Another object of my invention is to provide such a recording means wherein the photographic film upon which the sound is recorded is moved out of contact with the slit through which the recording light passes.

Another object of my invention lies in a means and method for adjusting the light rays which reach the photographic film by means of an oscillating lens through which such light rays pass.

Other objects and advantages in details of construction and arrangement will be apparent as the description proceeds, reference now being had to the figures of the accompanying drawings forming a part of this application and wherein like reference numerals indicate like parts.

In the drawings:—

Figure 1:
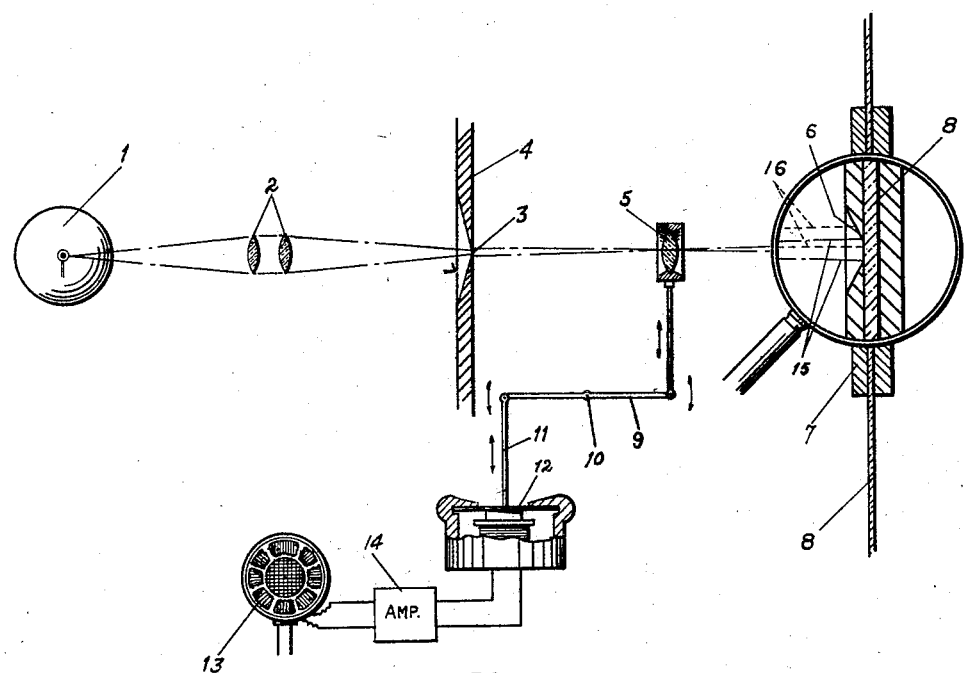
Figure 1 is a diagrammatic illustration of the apparatus used in carrying out my invention, certain parts thereof being shown in section and broken away for clearness.
Figure 2:
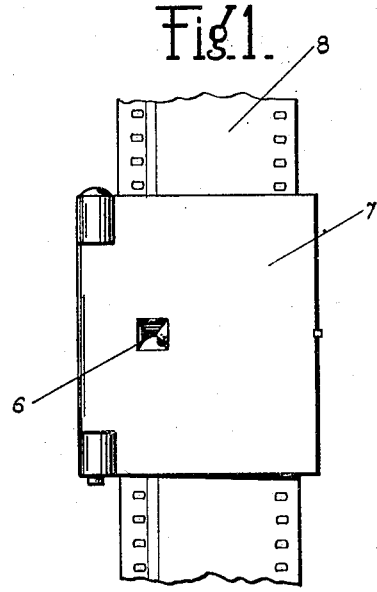
Figure 2 is a detail front view of the film gate through which the photographic film passes.

In carrying out my invention, I provide a lamp 1 of constant intensity, the light rays from which pass through condensor lenses 2 and are focused upon the stationary slit 3, formed in a suitable plate 4. The light rays passing through the slit 3 are caught by a lens 5 adapted to be oscillated in a manner to be described, and from the lens 5, such rays pass to an opening 6 in a film gate 7 through which the photographic film 8 is moved in any suitable manner, whereby the light rays will be photographed upon the film to form a sound record.

As shown in Figure 1, the lens 5 is positioned between the stationary slit 3 and the film. This lens 5 is carried upon one end of a crank 9 pivoted as at 10 and the opposite end of which is connected to a pin 11 secured at its opposite end to a diaphragm 12. The diaphragm may be vibrated and cause the lens 5 to oscillate in accordance with the vibration of the diaphragm 12, as controlled by the sound to be recorded and as illustrative, I have shown a microphone 13 suitably connected to an amplifier 14, the output of which operates the diaphragm 12. Obviously, therefore, by this means just described, it will be clear that the lens 5 in the path of the light rays from the slit 3 will be vibrated or oscillated in accordance with the sound waves to be recorded. The result of this oscillation of the lens 5 is shown clearly in Figure 1 wherein the point at which the light from the lens strikes the film gate and opening is greatly magnified. The lines 15 indicate the normal path of the light rays from the lens 5 when the same is stationary. In this position, it will be seen that practically all of the focused light rays pass through the opening 6 to the film 8. Oscillation of the lens 5 up or down however, will cause a portion of the light rays to be masked or cut off from the film 8 by the edges of the opening 6 in the film gate. This is illustrated by the dotted lines 16. Obviously, therefore, the amount of light reaching the film 8 from the lens 5 is controlled by the oscillation of such lens, and as the lens 5 is oscillated in accordance with the original sound wave, it will be seen that the record photgraphed upon the film 8 will be in exact accordance with the original sound.

Of course, changes may be made by way of detail in arrangement without departing from the spirit and scope of my invention. I do not limit myself therefore, to the exact form herein shown and described other than by the appended claims.

I claim:—

1. Means for making photographic sound records comprising a light source of constant intensity, a slit member illuminated thereby, a second slit member, a sensitized film movable past and closely adjacent an opening in said second slit member, a lens adapted to focus a beam of light from the first said slit member through the opening in said second slit member and upon said film and means controlled by and in accordance with the sound to be recorded for oscillating said lens and for causing said light beam to be directed alternately through the opening of said second slit member and upon the masked portion thereof longitudinally of the direction of motion of said film whereby the intensity of light projected upon said film is varied in accordance with the vibrations of said sound.

2. A photographic sound recording apparatus comprising a slit member the slit whereof is illuminated at constant intensity, a mask having an opening therein, a sensitized film movable past said opening and closely adjacent thereto, a lens between said slit and said opening and arranged to project a web-shaped beam of light from said slit through said opening and to focus said beam on said film, and sound controlled means for vibrating said lens and for vibrationally deflecting the web of said beam longitudinally of the direction of motion of said film so as to be variably intercepted by said mask in accordance with the amplitude of vibration of said lens.

3. Means for making photographic sound records, comprising a light source of constant intensity, means for directing light from said source through a slit to a lens, means for converting sound into electrical variations, means for amplifying and converting said electrical variations into vibrations of said lens and a mask having an opening therein substantially at the focus of said lens, whereby portions of the light from said lens are intercepted by said mask, and the remaining portions, varying in accordance with said sound, pass through said opening to a sensitized film.

4. Means for photographically recording vibrations comprising a light source of constant intensity, a slit member arranged to define a narrow beam of said light, a second slit member, a sensitized film movable past and closely adjacent the opening in said second slit member, a lens arranged to focus the light from the first said slit member through the second said slit member and upon said film and means for converting the vibrations to be recorded into corresponding vibrations of said beam in the direction of motion of said film, whereby said vibrations are recorded as a photographic record of constant width and varying density.

5. The method of sound recording on photographic film which comprises the steps of vibrationally actuating a lens under the control of electrical impulses representative of sound vibrations, projecting a web-shaped beam of light from a constant source of illumination through said lens, focussing said beam upon a moving sound track of said film, vibrationally deflecting said beam longitudinally of the direction of motion of said film, screening said film from said beam in certain directions of the beam's deflection and thereby modulating the intensity of light to which said film is exposed in accordance with the sound waves to be recorded.

In testimony whereof, I affix my signature.

FREEMAN H. OWENS.